United States Patent
McCabe et al.

(10) Patent No.: US 7,291,576 B2
(45) Date of Patent: Nov. 6, 2007

(54) $SO_x$ TRAP FOR DIESEL AND LEAN-BURN GASOLINE AUTOMOTIVE APPLICATIONS

(75) Inventors: Robert McCabe, Lathrup Village, MI (US); Woosang Chun, Plymouth, MI (US); George Graham, Ann Arbor, MI (US); Clifford Montreuil, Livonia, MI (US); Brendan Carberry, Aachen (DE); Albert Chigapov, Aachen (DE); Alexei Dubkov, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 421 days.

(21) Appl. No.: 10/748,594

(22) Filed: Dec. 30, 2003

(65) Prior Publication Data

US 2005/0145827 A1   Jul. 7, 2005

(51) Int. Cl.
  *B01J 21/00* (2006.01)
  *B01J 23/00* (2006.01)
  *B01J 23/32* (2006.01)
  *B21D 51/16* (2006.01)
  *B01D 50/00* (2006.01)

(52) U.S. Cl. ............... 502/244; 502/302; 502/345; 502/349; 502/324; 29/890; 422/168

(58) Field of Classification Search ........... 502/244, 502/302, 345, 349, 324; 29/890; 422/168
See application file for complete search history.

(56) References Cited

U.S. PATENT DOCUMENTS

| | | | | |
|---|---|---|---|---|
| 3,179,488 A | * | 4/1965 | Appell | 423/213.2 |
| 4,141,959 A | * | 2/1979 | Kato et al. | 423/239.1 |
| 4,617,175 A | * | 10/1986 | Tolpin et al. | 422/171 |
| 4,814,153 A | * | 3/1989 | Kobayashi et al. | 423/213.2 |
| 5,202,101 A | * | 4/1993 | Cohen et al. | 423/243.06 |
| 5,472,673 A | | 12/1995 | Goto et al. | |
| 5,473,890 A | | 12/1995 | Takeshima et al. | |
| 5,687,565 A | | 11/1997 | Modica et al. | |
| 5,792,436 A | | 8/1998 | Feeley et al. | |
| 5,916,129 A | | 6/1999 | Modica et al. | |

(Continued)

FOREIGN PATENT DOCUMENTS

EP    0 815 925    *  1/1998

(Continued)

*Primary Examiner*—J. A. Lorengo
*Assistant Examiner*—Patricia L. Hailey
(74) *Attorney, Agent, or Firm*—Damian Porcari; Brooks Kushman P.C.

(57) ABSTRACT

The present invention provides a regenerable catalyst composition suitable for entrapping $SO_x$. The composition of the invention comprises a copper oxide having the formula (Cu/(A oxide) where A oxide is $SiO_2$, $Zr$—$SiO_2$, $Al_2O_3$, $TiO_2$—$Al_2O_3$, $ZrO_2$ and $In_2O_3$ or mixtures thereof. Copper loading may vary from about 10 to 60 mol % and is preferably about 25 mol %. The catalyst composition adsorbs $SO_x$ as metal sulfate under lean conditions and desorbs accumulated $SO_x$ as $SO_2$ under rich conditions. Such reversible $SO_x$ trap are able to operate under conventional $NO_x$ trap operating conditions to prevent sulfur poisoning of the $NO_x$ trap. Furthermore, these traps may be regenerated under rich conditions at 300-450° C. In another embodiment of the present invention, an irreversible $SO_x$ trap capable of collecting $SO_x$ under lean conditions is provided. The traps of this embodiment include praseodymia, zirconia-praseodymia and mixed manganese-yttria and mixtures thereof.

13 Claims, 6 Drawing Sheets

U.S. PATENT DOCUMENTS

| | | |
|---|---|---|
| 6,119,450 A | 9/2000 | Boegner et al. |
| 6,145,303 A | 11/2000 | Strehlau et al. |
| 6,355,220 B1 * | 3/2002 | Blanchard et al. ....... 423/242.1 |
| 7,175,822 B2 * | 2/2007 | Nakatsuji ................. 423/239.1 |
| 2001/0035006 A1 | 11/2001 | Dou et al. |

FOREIGN PATENT DOCUMENTS

| | | | |
|---|---|---|---|
| EP | 0 888 816 B1 | | 7/1998 |
| EP | 0 888 816 | * | 1/1999 |
| EP | 1 374 978 | * | 1/2004 |
| EP | 1 378 289 | * | 1/2004 |
| EP | 0 815 925 B1 | | 12/2004 |
| EP | 1 634 638 | * | 3/2006 |
| WO | WO 98/28063 | * | 7/1998 |

\* cited by examiner

$SO_x$ TRAP FOR DIESEL AND LEAN-BURN GASOLINE AUTOMOTIVE APPLICATIONS

CROSS-REFERENCE TO RELATED APPLICATION

This application is related to EP 02100748.9 filed Jun. 25, 2002.

BACKGROUND OF THE INVENTION

1. Field of the Invention

The present invention relates to a regenerable catalyst composition suitable for entrapping $SO_x$. More particularly, the present invention relates to a Diesel Oxidation Catalyst ("DOC") or a Catalyzed Soot Filter ("CSF") comprising the catalyst composition of the invention. The invention further relates to the use of a catalyst composition that adsorbs $SO_x$ as metal sulfate under lean (oxidative) conditions and desorbs accumulated sulfate as $SO_2$ under rich (reducing) conditions.

2. Background Art

Sulfur oxides ($SO_x$) have a detrimental affect on the performance of automotive catalysts and traps. Such automotive catalysts and traps typically include noble metals and/or Ce-Zr oxide. At present, one of the most challenging problems in the design of lean burn and diesel engines relates to the removal of $NO_x$ components. Currently, there is a lack of known reductants for the selective catalytic reduction of $NO_x$ to nitrogen for such engines. However, current 3-way catalysts do meet the requirements of newly developed engines with lean air/fuel mixtures. $NO_x$ traps (NO storage catalyst) have the ability to store $NO_x$ under oxidizing (lean) conditions and to reduce the stored $NO_x$ to $N_2$ under reducing (rich) conditions. Unfortunately, a drawback of $NO_x$ traps is their intolerance to $SO_x$ compounds derived from sulfur in the fuel and lube oil, leading to a gradual deterioration of their performance (see, S. Hodjati, P. Bernhardt, C. Petit, V. Pitchon, A. Kiennenmann, *Removal of $NO_x$: Part I. Sorption/desorption processes on barium aluminate*, Applied Catalysis B. Environmental 19 (1998) 209-219). This reference in its entirety is hereby incorporated by reference. Thermodynamically, metal sulfates decompose at higher temperatures and are more stable than the corresponding metal nitrates. It is difficult to create a $NO_x$ trap having sufficient sulfur resistance. This problem is especially challenging for diesel engines due to the higher sulfur level in diesel fuel than in gasoline. $NO_x$ traps currently are limited to markets where the sulfur content in gasoline and diesel fuel is very low. However, even with low sulfur fuel, periodic desulfation of the $NO_x$ trap is required.

One current strategy utilized to deal with the problems associated with desulfation is to increase the operating temperature of the catalyst to 600°-650° C. under rich conditions. High temperature operation using excess fuel leads to the gradual thermal deactivation of the $NO_x$ trap and requires a special control management strategy. Another possible solution for avoiding sulfur poisoning of a $NO_x$ trap or a DOC is to place a $SO_x$ storage material upstream of $NO_x$ trap. Such a $SO_x$ storage material should be able to collect $SO_2$ under lean conditions in the operating temperature window of the $NO_x$ trap (normally 300-450° C.). The $SO_x$ storage material may be regenerated under conditions that are safe for the $NO_x$ trap. Under rich (reducing conditions) $SO_2$ is not expected to be a poison for the $NO_x$ trap. This is particularly true because of the elevated temperatures during rich operation that are favorable for $SO_2$ desorption. Moreover, the $NO_x$ trap is typically full of adsorbed $NO_x$ at the time of $SO_2$ release thereby preventing $SO_2$ adsorption on $NO_x$ trap material.

Materials that have been proposed for reversible $SO_x$ removal from flue and other industrial waste gases include copper, iron, and manganese containing systems. Studies have demonstrated that copper oxide-based sorbents (typically, 5% Cu on a support) have the best sorption-regeneration characteristics for applications at around 350-400° C. (see for example, R. F. Vogel, B. R. Mitchell, F. E. Massoth *Reactivity of $SO_2$ with supported metal oxide-alumina sorbents*, Environ. Sci. Technol., 8, No. 5 (1974) 432-436; M. H. Cho, W. K. Lee, *$SO_2$ removal by CuO on γ-alumina*, J. Chem. Eng. Japan, 16, No. 2 (1983)127-131; J. H. A. Kiel, W. Prins, W. P. M. van Swaaij, *Flue gas desulfurization in a gas-solid trickle flow reactor with a regenerable sorbent*, Gas Separation Technology (ed. E. F. Vansant, R. Dewolfs), Elsevier, Amsterdam, 1991, 539-548). Copper containing systems display reasonable stability in multi-cycle processes, including tolerance to water vapors and over-heating. These systems are currently used for high-temperature $SO_x$ removal from flue gases. Examples of such systems include $Cu/Al_2O_3$ and more recently $Cu-CeO_2$ (Yoo K. etc. Ind. Eng. Chem. Res., v. 33, 7 (1994), p. 1786, J. F. Akyurtlu, A. Akyurtlu, Chem. Eng. Sci., 54 (15-16) 2191-2197 (1999), H. W. Pennline, Fuel & Energy Abstracts, 38 (1997), N3, p. 187, Centi G, Perothoner S., Developments in Chem. Eng. & Mineral Processing, 8 (2000), N5-6, p. 441, Wang Z. Industrial & Eng. Chem. Research, 37 (1998), N12, p. 4675, Jeong S., Kim S., Industrial and Eng. Chem. Research, 39 (200), N6, p. 1911).

More recently, a number of other materials have been proposed for $SO_x$ removal. Such materials include, $Pt-CeO_2-ZrO_2$ and $Pt-CeO_2$ (F. M. Allen, S. Khairulin, T. J. Zega, R. J. Farrauto, *Reusable $SO_x$ traps: Materials and methods for regeneration*, AIChE Meeting, Nov. 15-20, 1998, Miami, Fla.; Section 4-3, p. 84-5), $MgAl_2-xFexO_4$ (J. Wang, Z. Zhu, C. Li, *Pathway of the cycle between the oxidative adsorption of $SO_2$ and the reductive decomposition of sulfate on the $MgAl_{2-x}Fe_xO_4$ catalyst*, J. Mol. Catal., 139 (1999) 31-41), $MgAl_2O_4$ (M. Waqif, O. Saur, J. C. Lavalley, Y. Wang, B. Morrow, *Evaluation of magnesium aluminate spinel as a sulfur dioxide transfer catalyst*, Appl. Catal., 71 (1991) 319-331), Co—Mg—Al mixed oxides (A. E. Palomares, J. M. Lopez-Nieto, F. J. Lazaro, A. Lopez, A. Corma, *Reactivity in the removal of $SO_2$ and $NO_x$ on Co/Mg/Al mixed oxides derived from hydrotalcites*, Appl. Catal. B., 20 (1999) 257-266), and $Cu-CeO_2$ (J. F. Akyurtlu, A. Akyurtlu, Chem. Eng. Sci., 54 (15-16) 2191-2197 (1999)). Moreover, dual-functional systems containing components for oxidizing $SO_2$ to $SO_3$ have been described. Such systems include Pt and $SO_x$ storing components selected from Ti, Zr, Sn, Fe, Ni, Ag and Zn oxides are described (K. Okuide, O. Kuroda, T. Yamashita, R. Doi, T. Ogawa, M. Fujitani, H. Lizuka, Sh. Azukibata, Yu. Kitahara and N. Shinotsuka. Jpn. Kokai Tokyo Koho JP 11 169, 708 (99 169,708) (Cl. BO1J23/42), 29 Jun. 1999, Appl. 1997/344,682, 15 Dec. 1997). These systems operate in two periodic steps that consist of an operation under oxidizing conditions and a far shorter operation under reducing conditions.

A number of other prior art systems are known for the removal of $SO_x$. For example, the possible use of $Pt-CeO_2-ZrO_2$ and $Pt-CeO_2$ in automotive applications has also been considered. (F. M. Allen, S. Khairulin, T. J. Zega, R. J. Farrauto, *Reusable $SO_x$ traps: Materials and methods for regeneration*, AIChE Meeting, Nov. 15-20, 1998, Miami, Fla.; Section 4-3, p. 84-5) The utilization of Pd—Ba sulfur traps has been attempted with only partial success. (Automotive Engineering/February 1997, p. 133). Ag/Al2O3 has been discussed as an effective $SO_x$ trap material (T. Nakatsuji, R. Yasukawa, K. Tabata etc. *Highly durable $NO_x$ reduction system*. SAE 980932). Finally, a number of prior art publications discuss the testing of sulfur traps without complete disclosure of the compositions. (O. H. Bailey, D. Dou and M. Moliner, *Sulfur traps for $NO_x$ adsorbers*, SAE 2000-01-1205; SAE 2000-01-1012; 2000-01-1932; 1999-01-2890; 1999-01-3557)

A number of U.S. patents also disclose $SO_x$ removing systems. For example, U.S. Pat. No. 5,472,673 (the '673 patent) discloses $SO_x$ adsorbents selected from alkali, alkali-earth, rare earth metals, that also contain Pt. The compositions disclosed in the '673 patent cannot be regenerated under $NO_x$ trap temperature limits thereby requiring a separate mode of operation under high temperatures. The materials of the '673 patent only function as irreversible $SO_x$ traps. Moreover, Pt containing adsorbents are also not acceptable due to the $H_2S$ release under rich conditions, as one can see below. U.S. Pat. No. 5,473,890 (the '890 patent) discloses a $SO_x$ absorbent containing at least one member selected from copper, iron, manganese, nickel, sodium, tin, titanium, lithium and titania. Pt is also used as a $SO_x$ adsorbent. The '890 patent does not disclose any example that illustrates the performance of such absorbents. The carrier utilized in the '890 patent is made of alumina with the adsorbent preferably being lithium. U.S. Pat. No. 5,687,565 (the '565 patent) discloses a very complex oxide composition this is designed for gasoline applications with high temperature of regeneration of $SO_x$ trap material. The composition of the '565 patent is an irreversible trap material because it is not designed to prevent the poisoning of $NO_x$ trap. The composition of the '565 patent contains alkaline-earth oxides (Mg, Ca, Sr, Ba) or Zn. The '565 patent mentions that Cu may be used to promote the basic formulations. Finally, the '565 patent discloses compositions that only use a small amount of noble metals (Ru, Os, Pd, Pt etc.). U.S. Pat. No. 5,792,436 (the '436 patent) discloses sorbents containing alkaline earth metal oxides of Mg, Ca, Sr, Ba in combination with oxides of cerium, Pr and group of oxides of elements of atomic numbers from 22 to 29 inclusive. Pt is used in each of the adsorbents of the '436 patent. The regeneration temperatures for $SO_x$ removal are high for the compositions of the '436 patent.

Although a number of prior art systems are known for the removal of $SO_x$ as set forth above, many of these systems are used for stationary systems and/or industrial systems (i.e., manufacturing plants). Accordingly, there is a need for alternative $SO_x$ removal systems for automotive applications.

SUMMARY OF THE INVENTION

The present invention overcomes the problems of the prior art by providing in at least one embodiment, a regenerable catalyst composition suitable inclusion in a $SO_x$ trap. This catalyst composition is advantageously incorporated into a gasoline engine exhaust catalyst, a diesel oxidation catalyst ("DOC"), or a catalyzed soot filter (CSF). In an embodiment of the present invention a platinum group metal ("PGM") free regenerable catalyst composition is provided. The catalyst composition of this embodiment comprises a component having formula I:

$$Cu/(A\ oxide) \qquad I$$

wherein A oxide is $SiO_2$, Zr—SiO2, $Al_2O_3$, $TiO_2$—$Al_2O_3$, $ZrO_2$, $In_2O_3$, and mixtures thereof. Said catalyst may in particular be used for adsorbing $SO_x$ as metal sulfate at a temperature in the range of 200 to 500° C. under lean (oxidizing) conditions. The desorption of said metal sulfate from the surface of the catalyst may be arranged at a temperature in the range of 250 to 450° C. under rich (reducing) conditions.

In another embodiment of the present invention, a $SO_x$ trap which comprises the catalyst composition of the invention is provided. The design of the $SO_x$ trap of the present invention balances a number of factors that are required for proper operation as illustrated in FIG. 1. These include prevention of poisoning of the $NO_x$ trap by complete removal of $SO_x$ upstream of $NO_x$ trap thereby accumulating $SO_x$ as sulfates on the surface of storage material at wide temperature range under lean conditions; decreasing the temperature of desulfation to $NO_x$ temperature operating limits under rich conditions; eliminating the thermal deactivation of $NO_x$ trap due to the low temperature of desulfation; synchronizing the desulfation and $NO_x$ reduction events under rich conditions, that leads to more simple control management; operating the $NO_x$ trap with constant activity in continuous mode without gradual decrease of activity between desulfation steps; using a higher sulfur level fuel; preventing the formation of sulfated ash. In developing the catalyst compositions of the present invention as $SO_x$ storage materials, the following criteria were found most important: high adsorption rate and $SO_x$ adsorption capacity at wide; temperature range (200-500° C.) under lean conditions; thermal stability of sulfates accumulated up to 600° C. under lean conditions; complete removal of $SO_x$ at wide temperature range under lean conditions; high activity of $SO_2$ oxidation to $SO_3$ is desirable. If oxidation catalyst (DOC) or catalyzed soot filter (CSF) capable to oxidize $SO_2$ to $SO_3$ is installed upstream of $SO_x$ trap, such requirement is not mandatory; the lower temperature of $SO_2$ release as possible under rich conditions; the narrow temperature range of $SO_2$ release under rich conditions; the only $SO_2$ release under rich conditions to prevent $H_2S$ slip above the smell threshold level; and finally, low cost, convenient method of preparation, opportunity to deposit on monolith, and good thermal stability.

In yet another embodiment of the present invention, a catalyst suitable for removing $SO_x$ from stationary operating engines used in industrial and power generation plants is provided. The catalyst of this embodiment includes praseodymia, zirconia-praseodymia and mixed manganese-yttria and mixtures thereof.

In another embodiment of the present invention, an exhaust treatment system reduces exhaust gas emissions from diesel, lean-burn gasoline and natural gas engines is provided. The exhaust treatment system of the invention incorporates the catalyst composition and/or the $SO_x$ trap set forth above is provided.

DETAILED DESCRIPTION OF THE PREFERRED EMBODIMENT(S)

Figure 1:
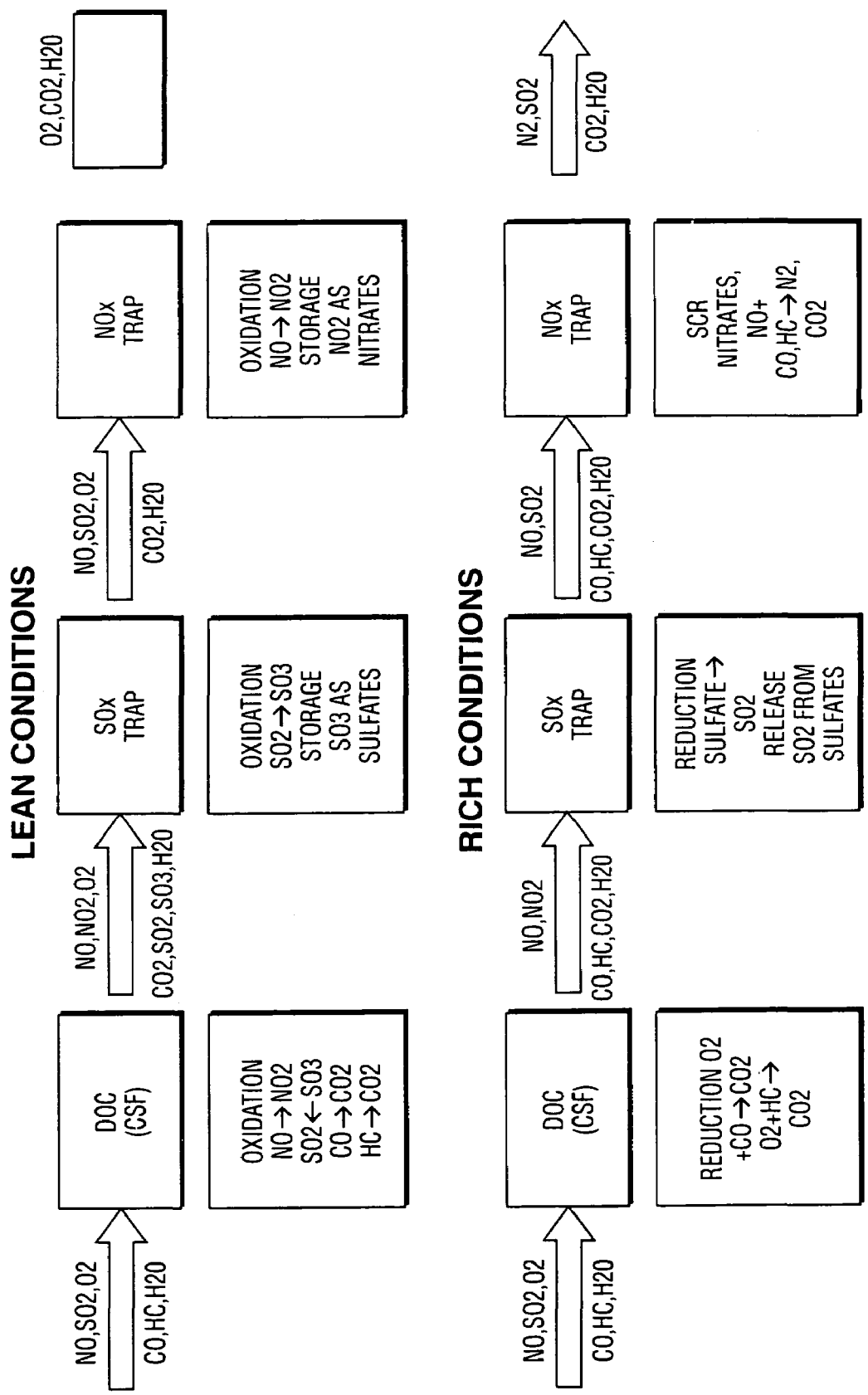
FIG. 1 is an illustration of the factors considered in the development of an effective $SO_x$ trap.

Reference will now be made in detail to presently preferred compositions or embodiments and methods of the invention, which constitute the best modes of practicing the invention presently known to the inventor.

In an embodiment of the present invention, a platinum group metal free (PGM) regenerable catalyst composition suitable for incorporation in a $SO_x$ trap is provided. The catalyst composition of the invention is described by formula I:

$$Cu/(A\ oxide) \qquad\qquad I$$

wherein (A oxide) is $SiO_2$, $Zr$—$SiO_2$, $Al_2O_3$, $TiO_2$—$Al_2O_3$, $ZrO_2$, $In_2O_3$, and mixtures thereof. The catalyst of this embodiment is particularly useful for adsorbing $SO_x$ as metal sulfate at a temperature in the range of 200 to 500° C. under lean (oxidizing) conditions. Advantageously, the catalyst is regenerated by the desorption of metal sulfate from the surface of the catalyst by heating to a temperature in the range of 250 to 450° C. under rich (reducing) conditions.

The design of the catalyst compositions of the present invention takes into account the acid/base characteristics of its constituents. For example, the oxides of Si, B, and P as well as $WO_3$, $MoO_3$, and $Re_2O_7$ have an acidic nature. In this latter category (i.e., $WO_3$, $MoO_3$, and $Re_2O_7$), the metal atom is in a high valence state and does not form sulfates on the surface of a trap or catalyst. It should be appreciated that other oxides that have a basic nature form sulfates on such surfaces. Basic oxides that contain alkali or alkaline earth metals tend to desorb sulfates at extremely high temperatures above 1000° C. Even under reducing conditions, sulfates tend to be desorbed only at 550-650° C. or higher from these alkali or alkaline earth metal containing oxides. Therefore, such oxides are not suitable for use as regenerable $SO_x$ traps. Oxides with a weakly basic adsorption sites do not have a sufficient affinity for $SO_x$ compounds. Accordingly, oxides containing moderately basic sites are the most promising materials for $SO_x$ traps. Although silica does not form sulfates, it may be used as a support because of its high surface area. Moreover, silica tends to decrease the temperature of $SO_x$ desorption. Similarly, alumina and titania are also suitable materials for supports even though these materials have relatively weak basic properties. Finally, the transition metal oxides should be deposited on a support for $SO_x$ adsorption applications since these materials tend to have a low surface area.

The $SO_x$ adsorption-desorption properties of a wide variety of oxides having different basicity are presented below. Among these oxides are binary and ternary systems. Moreover, the effect of Pt which is known as an effective catalyst for oxidation $SO_2$ to $SO_3$ and for the reduction of $SO_x$ in hydrogen is also evaluated (T. R. Felthouse, D. A. Berkel, S. R. Jost, E. L. McGrew, A. Vavere Platinum-Catalyzed Sulfur Dioxide Oxidation Revisited, in: Advanced Catalysts and Nanostructured Materials—Modern Synthetic Methods, (W. R. Moser Ed.), Academic Press, San Diego-London-Boston-New York-Sydney-Tokyo-Toronto, 1996, p. 91-115); (P. Bazin, 0. Saur, J. C. Lavalley, G. Blanchard, V. Visciglio, 0. Touret "Influence of platinum on ceria sulfation", Appl. Catal. B. 13 (1997), 265-274).

In another embodiment of the present invention, a platinum group metal free (PGM) regenerable catalyst composition substrate suitable for entrapping $SO_x$ is provided. The composition of this embodiment comprises praseodymia, zirconia-praseodymia and mixed manganese-yttria and mixtures thereof. The catalyst composition of this embodiment is particularly useful for adsorbing $SO_x$ as metal sulfate at a temperature in the range of 200 to 500° C. under lean (oxidizing) conditions. The desorption of the metal sulfate from the surface of the catalyst composition of this embodiment is achieved by heating at a temperature in the range of 600 to 650° C. under rich (reducing) conditions.

In another embodiment of the present invention, a regenerable $SO_x$ trap for diesel and lean-burn gasoline automotive applications that incorporates the catalyst composition of the invention is provided. The regenerable trap of the present invention includes a catalyst composition that adsorbs $SO_x$ as metal sulfate under lean (oxidative) conditions and desorbs accumulated sulfate as $SO_2$ under rich (reducing) conditions. The catalyst composition of the invention advantageously prevents sulfur poisoning of other exhaust treatment traps or catalysts such as $NO_x$ traps or $NO_x$ reduction catalysts. Accordingly, the $SO_x$ trap of the present invention will typically operate under the same conditions as a $NO_x$ trap. Moreover, the $SO_x$ trap removes and accumulates sulfur compounds on its surface at a wide temperature range under lean conditions, thus preventing the sulfur poisoning, while releasing sulfur compounds as $SO_2$ at low temperatures as possible under short periods of rich (reducing) conditions. The noble metal components of $NO_x$ trap cannot oxidize $SO_2$ under rich conditions and cannot accumulate sulfur as metal sulfates, while $SO_2$ is weakly adsorbed, especially at elevated temperatures and easily removed under rich conditions. It should facilitate the automotive catalysts and $NO_x$ traps to operate in continuous mode at lower temperatures using high-level sulfur containing fuels. The trap should allow synchronizing the desulfation and $NO_x$ reduction events under rich conditions. To develop this idea, a number of materials have been tested as promising candidates for $SO_x$ trap materials. Among them, the copper-containing materials, especially $Cu/SiO_2$, $Cu/ZrSiO_2$, $Cu/Al_2O_3$, $Cu/TiO_2$—$Al_2O_3$, $Cu/ZrO_2$, and $Cu/In_2O_3$ were found to fit the basic requirements for $SO_x$ reversible trap materials. These materials have a high adsorption capacity and a concurrent sufficient rate of $SO_x$ adsorption as sulfates at a wide temperature range (200-500° C.) under lean conditions, while release accumulated sulfates as $SO_2$ at low temperatures (250-450° C.) with a narrow temperature range of complete removal of sulfates in the course of desulfation event.

The $SO_x$ traps of the present invention may be installed upstream of a $NO_x$ trap and preferably downstream of Diesel oxidation catalyst (DOC) or catalyzed soot filter (CSF) to provide high effectivity of $SO_x$ removal. Alternatively, a DOC and/or CSF may be impregnated with the $SO_x$ trap material set forth above, or the $SO_x$ trap material may be applied to a CSF together with $NO_x$ trap material.

The following examples illustrate the various embodiments of the present invention. Those skilled in the art will recognize many variations that are within the spirit of the present invention and scope of the claims.

I. Materials

Commercial silica gel purchased from Aldrich® (Silica gel for column Chromatography 70-230 mesh, pores of 60 Å) and calcined at 800° C. for 2 h were used for all experiments. $SiO_2$-supported sorbents were prepared by impregnation of silica gel with corresponding metal nitrates (supplied by Aldrich® and Alfa® Aesar), followed by drying and calcination at 620° C. for 2 h. A Zr—$SiO_2$ support was prepared by impregnation of $SiO_2$ with Zr citrate, ammonium complex (Aldrich®) followed by drying and calcinations for 2 h at 800 C with a zirconium content of 10 wt % $ZrO_2$. Zr—$SiO_2$-supported sorbents were prepared by the same procedure as for $SiO_2$-supported materials. Pt on Zr—$SiO_2$ was prepared by impregnation of a support with a water solution containing $H_2PtCl_6$ and citric acid, followed by drying and calcinations for 2 h at 600° C. Platinum loading was maintained constant as 1 wt %. For all materials prepared on silica, the original 70-230 mesh size samples were used for the TG experiments and TPR-MS runs.

$ZrO_2$, $CeO_2$, $Pr_6O_{11}$, and binary oxides CeZr 1:1 (molar ratio), CePr 1:1, ZrPr 1:1, Cu and Ag-containing binary systems with ceria, zirconia, india, magnesia, zinc, yttria and copper oxide, Mn-yttria were prepared by a cellulose templating method, using Whatman®542 filter paper as cellulose material. The detailed procedure is described elsewhere (A. N. Shigapov, G. W. Graham, R. W. McCabe, U.S. Pat. No. 6,139,814, Oct. 31, 2000). Briefly, a cellulose material was impregnated with 0.1-0.2 M solution of precursor nitrate salts (zirconium dinitrate oxide in the case of zirconia) in water followed by drying at room temperature overnight. The impregnated cellulose material is combusted at 800° C. for 2 h.

Pt-loaded Zr, Ce, and Pr single and binary oxides were prepared by the same procedure described above for the Pt—(Zr—$SiO_2$) system. The Pt loading was about 1 wt % for all systems tested, except for Pt—CeZr and Pt—CePr which was 2 wt % Pt.

All samples were used for the TGA experiments as prepared. Alumina-titania mixed supports, alumina, and titania were prepared by a modified sol-gel method which includes fast hydrolysis in excess of boiling water of metal alkoxides followed by drying and calcination (C. N Montreuil and M. Chattha, U.S. Pat. No. 5,922,294). Samples were calcined at 600° C. and at 800° C. Samples of 1 wt % Pt on Al—Ti, $Al_2O_3$, and $TiO_2$ were prepared from a corresponding Al—Ti samples by impregnation of a support with $H_2PtCl_6$ solution followed by calcination, and Pt reduction in 5% $H_2$—$N_2$ for 3 h at 400° C.

The Ti—Al (8:1) sample was prepared by a modified sol-gel method using impregnation of filter paper with an alcohol solution of metal alkoxides followed by drying and calcinations at 600° C. or 800° C. The support was then impregnated with the solution of copper nitrate.

Cu/alumina samples were prepared by impregnation of commercial γ-alumina, Brockmann acidic S=155 $m^2$/g, with copper nitrate followed by drying and calcinations at 600° C.

The FeZSM5-30 sample was prepared from 80-wt % of HZSM-5 ($SiO_2$: $Al_2O_3$=30 (mol)) (Zeolyst Co.) and 20-wt % of a binder ($Al_2O_3$ sol). The material was then ion exchanged with Fe to an atomic ratio Fe/Al=1.0. Calculated Fe content was 0.78 mmol Fe/g of a sample. Particles of 35-60-mesh size were used in the TG experiments.

FeZSM5-50, CuZSM5 and CuMgZSM5 zeolite samples were also prepared. The detailed procedure for their preparation is described elsewhere (A. V. Kucherov, A. N. Shigapov, A. A. Ivanov and M. Shelef. J. Catal., 186, 334-344 (1999)). The iron or copper concentration was about 0.5 wt % Fe or Cu in ZSM-5 type zeolite ($SiO_2$: $Al_2O_3$=50). Zeolite samples were pressed into pellets, calcined for 2 h at 540° C. followed by crushing and sieving. CuMgZSM5 had Cu concentration of 0.5-wt % and Mg concentration of 0.7 wt %.

Particles of 100/120-mesh size were used in the TG experiments except for CuZSM5 having particles less then 0.5 mm. The BET surface area of samples studied is presented in Table 2 and 3. Samples loadings of about 20-60 mg were typically used for the TG measurements.

II. Methods a. Surface Area and Porosity

Texture properties of the samples were studied by nitrogen adsorption-desorption at −196° C. using a Micromeritics ASAP 2400 instrument. The samples were outgassed at 350° C. for 2 h prior to measurements.

b. XRD Analysis

XRD measurements of materials tested were carried out using a Scintag® X1 diffractometer with Cu K α radiation on powdered samples packed into a 1 mm-deep cavity in a zero-background quartz sample holder.

c. Thermogravimetric (TG) Experiments

Thermogravimetric experiments were performed using a Cahne® 2000 microbalance operating in a flow mode. Helium UHP (100 sccm) was used to purge the microbalance chamber.

A conventional flow setup was used for gas mixtures preparation. All gases were of ultra high purity or certified calibration mixtures. Nitrogen and oxygen were further purified using standard columns with molecular sieves. Matheson® MF controllers were used to maintain the flow rates.

A quartz reaction vessel of tube-in-tube and side inlet/outlet design was used in the experiments performed with quartz suspensions and pans for the samples. The reaction gases (nitrogen, $SO_2$, hydrogen-argon mixture) were introduced into the reaction vessel through the side inlet, heated by-passing through the tube-in-tube zone, and directed upstream passing the sample. At a relatively large distance above the sample location, the reaction gas is mixed with purge helium. Both the helium and the reaction gases exited the reaction vessel through the side outlet. A thermocouple was mounted in the special quartz tube inside the reaction vessel and positioned as close as possible to a sample pan. This temperature was measured as the "sample temperature".

Standard sulfation gas of the following composition was used: 800 ppm $SO_2$, 10% $O_2$; nitrogen—balance. Flow rates of 50 to 150 sccm were used for different runs. Nitrogen UHP with flow rates of 50-150 sccm was used during isothermal desorption (purge) or TPD (50 sccm only) of the $SO_x$ formed. A certified mixture of 1000 ppm $SO_2$ in nitrogen was used as $SO_2$ supply of the reaction gas. A 10% $H_2$ in Ar mixture from a cylinder was used for the rich (reducing) experiments with flow rate of 50 sccm).

The desufation tests included the following treatments:
1. Pretreatment in 10% $O_2$—$N_2$, flow 55 sccm; fast heating of the sample from room temperature to 200° C.; then temperature-programmed heating (10 C/min) from 200 to 700° C.; holding sample for 10 min at 700° C.; cooling to 500° C.
2. 1 hour-$SO_x$ uptake tests at 500° C. using gas containing 800 ppm $SO_2$, 10% vol. $O_2$ in nitrogen (standard $SO_x$ gas mixture) with flow rate of 50 sccm).
3. $SO_x$ isothermal desorption test at 500° C. h was performed in nitrogen flow of 50 sccm for 0.5 h after the sulfation.
4. TPD ($SO_x$ thermal stability test) in the temperature interval of 500-700° C. with heating rate of 5° C./min.
5. TPR ($SO_x$ and extra-species reducibility test) in the temperature interval of 200-700° C., with heating rate of 5° C./min, and using 10% vol. $H_2$ in Ar (50 sccm) as the reducing agent.
6. 1 hour-$SO_x$ uptake tests at 200° C. using the standard $SO_x$ gas mixture followed by:
7. Temperature-Programmed Sulfation (TPS) test (all in the standard $SO_x$ gas mixture); temperature-programmed heating (1° C./min) from 200 to 615° C., holding 30 min at 615° C., then cooling to 150-200° C.

TG data was collected using a Rustrak® Ranger II Data Logger.

d. TPR-MS Measurements of the Sulfated Samples.

The samples were sulfated overnight at 500° C. using the standard sulfation gas. Reduction of the materials was studied by temperature-programmed reduction ("TPR") measurements carried out with Altamira Instruments' AMI-1 system employing a thermal conductivity detector ("TCD"). The standard pretreatment of samples includes the heating of the powder sample (typical loading of 50 mg, although for some samples only 15 mg were available) at 500° C. for one hour in a flowing mixture of 10% oxygen in helium at the rate of 25 cc/min. to ensure full oxidation. The sample was then cooled to 30° C. in the same gas flow. The cooled sample is then purged with Ar prior to introduction of the reduction mixture. After switching to reduction gas (9.4% $H_2$ in He) at a flow rate of 25 cc/min, the TPR experiment was commenced by temperature ramping of the sample from 30° C. to 900° C. at the rate of 15° C./min. Moreover, the effluent gas was sampled from the AMI-1 into the Traspector-CIS$_2$ System mass spectrometer with electron multiplier (EM) from Leybold® Inficon Inc.

III. Results a. Supports (Oxides of Non-Transition Metals)

$SO_x$-related properties of a number of the single and binary oxides are presented in Table 1. The oxides are listed in the order of increasing basic properties (according to (Y. Moro-oka, Catal. Today, 45 (1998) 3-12)). It is obvious from Table 1 that $SO_2$ capture ability increases with the basicity of the material.

TABLE 1

Dependence of the $SO_x$ trap properties of different oxides on their basicity. Basicity tends to increase downwards.

| Oxide | $SO_x$ loading at 200° C., mg/g | $SO_x$ loading at 500° C., mg/g | $SO_x$ loading at 500° C., mg/m$^2$ | Temperature of 50% thermal desorption, ° C. | Temperature of 50% re-duction, ° C. |
|---|---|---|---|---|---|
| $SiO_2$ | — | 2.5 | 0.006 | 670 | 490 |
| Zr—$SiO_2$ | 0.32 | 1.0 | 0.0025 | 635 | 470 |
| $TiO_2$ | 2.3 | 3.0 | 0.12 | >615 | 555 |
| $ZrO_2$ | 6.3 | 8.8 | 0.14 | >700 | 555 |
| Al—Ti 1:8 | 2.4 | 2.2 | 0.047 | 683 | 500 |
| Al—Ti 1:3 | 3.6 | 2.2 | 0.032 | 763 | 515 |
| Al—Ti 1:1 | 5.0 | 1.7 | 0.018 | 791 | 540 |
| Al—Ti 3:1 | 4.6 | 2.3 | 0.018 | 782 | 515 |
| $Al_2O_3$ | 12.7 | 9.5 | 0.066 | >800 | 580 |
| CeZr 1:1 | 12 | 36 | 0.28 | 675 | 550 |
| ZrPr 1:1 | 24 | 31 | 0.34 | >>700 | 660 |
| $CeO_2$ | 3.1 | 30 | 0.28 | 695 | 590 |
| CePr 1:1 | 3.6 | 39 | 0.42 | >>700 | 675 |
| $Y_2O_3$ | 3.1 | 48 | 0.43 | >700 | 605 |
| $Pr_6O_{11}$ | 15 | 60 | 1.54 | >700 | 675 |

The more basic oxides (downwards from $Al_2O_3$), as a rule, are very effective in $SO_2$ removal. Certain of these oxides (ZrPr and $Pr_6O_{11}$) are effective both at 200° C. and 500° C. The less basic oxides ($SiO_2$, $TiO_2$, $ZrO_2$; $Al_2O_3$) exhibit lower $SO_x$ capacities (per weight, and per specific area). At 200° C., only ZrPr and $Pr_6O_{11}$ have $SO_x$ capacity (per area) that is significantly higher than for the other materials. The adsorption capacities per weight of the material are more important for potential $SO_x$ trapping applications. With regards to the adsorption capacity per weight, the oxides of $Al_2O_3$, CeZr, ZrPr, $Y_2O_3$ and especially Pr6O$_{11}$ are effective for $SO_x$ removal. Analysis of the results obtained for binary (CeZr, ZrPr) oxides shows that zirconium addition increases the removal of $SO_x$ at 200° C. For the CeZr mixed oxide, the $SO_x$ capacity of the binary oxide is higher than that of the individual oxides ($CeO_2$ and $ZrO_2$).

The thermal stability of the sulfates on all the oxides studied is sufficiently high (i.e., none of the sulfates decomposed at temperatures below 615° C.) The reduction characteristics of the sulfates are in agreement with published data. (A. Pieplu, O. Saur, J. C. Lavalley "Claus Catalysis and $H_2S$ selective oxidation", Catal. Rev.-Sci. Eng., 40 (4) 409-450 (1998)). The temperature of reduction of sulfates increases with the increase of basic properties of the corresponding oxide. Sulfates formed on moderately basic oxides can be reduced and released at 470° C. (Zr—$SiO_2$) –550° C. (zirconia, titania). The sulfates accumulated on more basic oxides can be regenerated only at 550-670° C. These temperatures are too high for automotive applications. The more basic oxides, such as $La_2O_3$, MgO have even higher temperatures of $SO_x$ release upon reduction.

The non-transition metal oxides do not appear suitable for reversible $SO_x$ trap applications. The rare earth-based oxide materials have too high a temperature of $SO_x$ reductive release (desulfation), while less basic oxides cannot capture $SO_x$ from exhaust gases.

b. Pt-Containing Adsorbents

Figure 2:
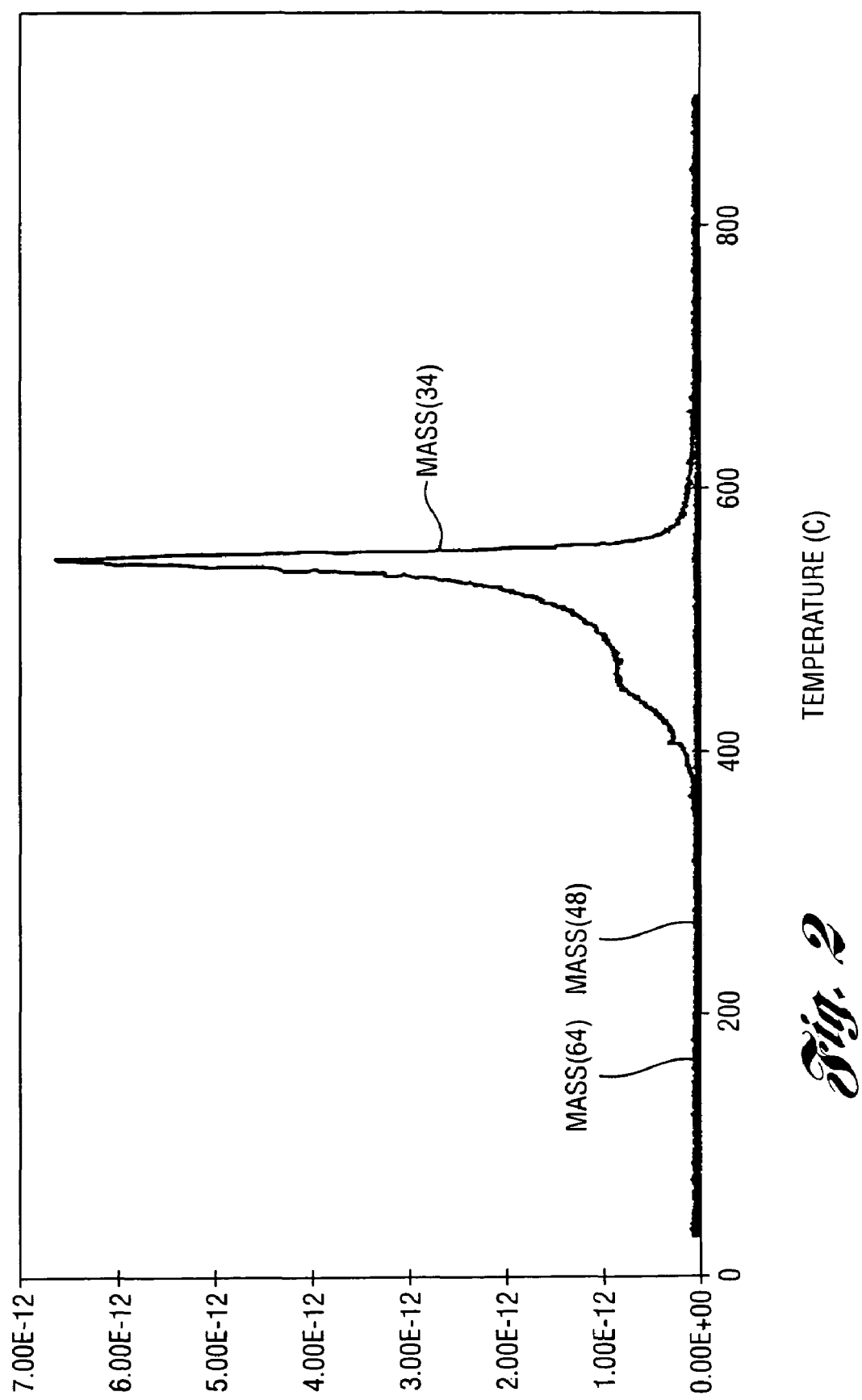
FIG. 2 provides plots of mass spectral analysis of the reductive regeneration products using the TPR-MS runs for sulfated Pt—CeZr (1:1) (Pt—CeZR is reference material)

The properties of materials containing platinum are summarized in Table 2. As a rule, Pt addition leads to increased $SO_x$ capacity, especially at 200° C. Moreover, Pt is an effective catalyst for oxidizing $SO_2$ to $SO_3$ thereby facilitating sulfate formation. It should be appreciated that the adsorption capacity at 200° C. is typically lower than the apparent adsorption capacity at 500° C. This apparent increased capacity reflects the increased oxidative ability of material at higher temperatures. It is known that generally, platinum addition to a catalyst lowers the temperature of sulfation light-off ("SLOT"). Such a decrease was only observed for $Pr_6O_{11}$ (which is intrinsically highly active at 200° C.) and Cu—(Zr—$SiO_2$). For other systems, a 30 to 285° C. shift to lower temperature is observed. The reductive release of $SO_x$ on Pt-containing systems is also usually shifted to lower temperature. Pt facilitates the reduction of sulfates and their removal from the surface of material. From this perspective, the Pt-containing systems look very attractive for inclusion in a $SO_x$ trap. However, mass spectral analysis of the reductive regeneration products using the TPR-MS runs revealed the formation of $H_2S$ as a main product. For the most active Pt-containing materials, Pt/$CeO_2$—$ZrO_2$, $H_2S$ was the only product (see FIG. 2). Pt promotes the deep reduction of the sulfates accumulated to $H_2S$. As an example, the fraction of $H_2S$ was 21% on CeZr(1:1) mixed oxide, but the addition of Pt led to 100% selectivity to $H_2S$.

The fraction of $H_2S$ was 35% for the best case, Pt/$CeO_2$. $H_2S$ formation is unacceptable for automotive applications. Therefore, the better option is to use Pt in Diesel oxidation catalyst formulations upstream of $SO_x$ trap to catalyze $SO_2$ oxidation to $SO_3$ under lean conditions, while non-platinum $SO_x$ trapping material will capture $SO_3$ as sulfate. Accordingly, Pt-containing materials are also not suitable for $SO_x$ trap applications.

c. Transition Metal Oxides Unsupported

The adsorption capacity of transition metal oxides (Cu, Zn, Cr, Mn, Co, Ni, Fe) and Ag was quite low. The absorption capacity of CuO was highest, but because of the low surface area did not exceed 11 mg/g at 500° C. Among the transition metal oxides studied, only copper and silver exhibited a low temperature of $SO_x$ desorption under reducing conditions. For example, the temperature of 50% release was 410° C. for CuO, and 420° C. for Ag. In contrast, the temperature of 50% release for iron oxide was nearly 500° C. while the other transition oxides had release temperature of about 565-610° C.

d. Non-Pt Supported Materials and Supports

A summary of the most important properties of oxide systems, including supported transition metals is provided in Table 3. Materials with low $SO_x$ capacity are not included in Table 3. Among the $SO_x$-storage material candidates, the copper containing materials have revealed the best properties. Cu—$SiO_2$ and Cu—Zr—$SiO_2$ were observed to have particularly good properties. Fe and Ag-containing systems had lower adsorption capacity and higher $H_2S$ fraction release. Transition metals supported on zeolites, had good releasing properties and good adsorption properties at low temperature of 200° C., but low adsorption capacity. In addition, these systems were not stable under operating conditions with irreversible deactivation. Mn, Co, and Pr containing systems had good $SO_x$ removal properties even at 200° C. and high adsorption capacity. However, the sulfates formed from these materials were too stable. However, Mn, Co, and Pr containing oxide systems are useful for irreversible $SO_x$ trap applications as will be discussed below. Finally, Ti and Zr oxides had a low adsorption capacity and high fraction of $H_2S$, while Y and Ce oxides required the high temperature for regeneration of sulfates collected.

TABLE 2

$SO_x$ trap properties of Pt-containing different oxides.

| Sample | S(BET), m2/g | $SO_x$ Loading, mg/g after 1 hr of sulfation | | Desorbed 500° C. $N_2$ 0.5 h, % | Desorbed in $N_2$ at T: | | | Reduced in $H_2$/Ar at T: | | | Sulfation Light-off T (SLOT), ° C. |
| --- | --- | --- | --- | --- | --- | --- | --- | --- | --- | --- | --- |
| | | 200° C. | 500° C. | | 10% | 50% | 90% | 10% | 50% | 90% | |
| Cu—PtZrSiO$_2$ | 373 | 1.75 | 22 | 22.5 | 540 | 610 | 690 | 215 | 245 | 340 | 375 |
| Pt—TiO$_2$ 600° C. | 26 | 15.6 | 15.9 | NA | 572 | 718 | NA | 277 | 356 | 499 | |
| Pt—Al:Ti 1:3 800° C. | 69 | 12.6 | 19.4 | 17.3 | 552 | 645 | 767 | 284 | 361 | 605 | 270 |
| Pt—Al:Ti 1:8 800° C. | 47 | 25 | 16.2 | 18.6 | 553 | 642 | 764 | 278 | 364 | 540 | 200 |
| Fe—PtZrSiO$_2$ | 389 | 5 | 13.3 | 13.6 | 550 | 655 | >700 | 315 | 365 | NA | 220 |
| Pt—Al:Ti 1:1 800° C. | 92 | 31.5 | 27.3 | 11.8 | 563 | 667 | 793 | 299 | 378 | 565 | 230 |
| Pt—Al:Ti 3:1 800° C. | 129 | 41 | 32.8 | 11.6 | 548 | 655 | >800 | 328 | 414 | 551 | 225 |
| Pt—CeO$_2$ | 106 | 14.3 | 30 | 1.4 | 635 | 690 | >700 | 380 | 455 | 520 | 200 |
| Pt—ZrO$_2$ | 63 | 13.2 | 18 | 6.6 | 590 | >700 | >>700 | 325 | 462 | 595 | 200 |
| Pt—CeZr 1:1 | 91 | 51 | 71 | 4.6 | 580 | 670 | >700 | 405 | 483 | 530 | 200 |
| Pt—CePr 1:1 | 93 | 1.25 | 79 | 0 | >700 | >>700 | >>>700 | 425 | 490 | 546 | 390 |
| Pt—Al$_2$O$_3$ 800° C. | 144 | 22.7 | 38.2 | 3.9 | 607 | 764 | >800 | 432 | 500 | 674 | 380 |
| Mn—PtZrSiO$_2$ | 402 | 9.3 | 34 | 3.1 | 627 | >700 | >>700 | 370 | 517 | 587 | 200 |
| Pt—Pr$_6$O$_{11}$ | 39 | 19.6 | 59 | NA | >700 | >>700 | >>>700 | NA | 615 | NA | 500 |
| Pt-Cordierite | 0.5 | 0.36 | 1 | NA | NA | NA | NA | NA | NA | NA | NA |
| Pt—TiO$_2$ 800° C. | 1 | 0.19 | 2.2 | 0 | 596 | 690 | 798 | NA | NA | NA | 280 |

NA—data non-available

TABLE 3

SO$_x$ trap properties of non-Pt supported materials

| Sample | S(BET) m2/g | SO$_x$ Loading, mg/g after 1 h of sulfation: 200° C. | 500° C. | Desorbed 500° C. N$_2$ 0.5 h, % | Desorbed in N$_2$ at T: 10% | 50% | 90% | Reduced in H$_2$/Ar at T 10% | 50% | 90% | Sulfation Light-off T (SLOT), ° C. |
|---|---|---|---|---|---|---|---|---|---|---|---|
| Cu$_{0.03}$—ZrSiO$_2$ (0.97) | 374 | 1.7 | 13.5 | 14.8 | 545 | 620 | 700 | 235 | 265 | 330 | 370 |
| Cu$_{0.03}$—SiO$_2$ (0.97) | 444 | 0.8 | 12 | 11.9 | 550 | 615 | 685 | 241 | 267 | 314 | 380 |
| Cu$_{0.25}$—ZrSiO$_2$ (0.75) | 294 | 3.3 | 104 | NA | 563 | 645 | >700 | 242 | 275 | 327 | 355 |
| Cu$_{0.1}$—SiO$_2$ (0.9) | 368 | 0.5 | 62 | NA | 572 | 625 | 670 | 235 | 280 | 337 | 350 |
| Cu$_{0.25}$SiO$_2$ (0.75) | 235 | 1.1 | 97 | NA | 570 | 633 | NA | 260 | 282 | 302 | 360 |
| Cu$_{0.5}$La$_{0.5}$ | 6 | 2.9 | 13 | NA | 568 | >700 | NA | 250 | 297 | 635 | 330 |
| Cu$_{0.5}$—Ti—Al (8:1) | 131 | 1.9 | 138 | NA | 612 | 700 | >700 | 277 | 323 | 378 | 360 |
| Cu$_{0.15}$Y$_{0.85}$ | 76 | 1.3 | 97 | NA | NA | NA | NA | 296 | 328 | 622 | 405 |
| Cu$_{0.5}$Y$_{0.5}$ | 52 | 2.2 | 69 | NA | 580 | 678 | >700 | 295 | 330 | 635 | 385 |
| Cu$_{0.5}$Ce$_{0.5}$ | 12 | 0.6 | 33 | NA | 655 | 700 | >700 | 300 | 335 | 637 | 390 |
| Cu-ZSM$_5$ | 423 | 3 | 5.5 | 5.1 | 540 | 660 | >700 | 280 | 340 | 465 | 260 |
| Cu$_{0.25}$—Al$_2$O$_3$ (0.75) | 110 | 5.5 | 78 | NA | 607 | >700 | NA | 317 | 340 | 387 | 380 |
| Cu$_{0.5}$Mg$_{0.5}$ | 29 | 4.1 | 36 | NA | 640 | >700 | NA | 312 | 342 | 606 | 397 |
| Cu$_{0.15}$Zr$_{0.85}$ | 37 | 4.4 | 40 | 6 | 580 | 616 | 680 | 320 | 346 | 380 | 370 |
| Cu$_{0.5}$In$_{0.5}$ | 42 | 0.2 | 89 | NA | 555 | 605 | >700 | 305 | 353 | 412 | 390 |
| Cu$_{0.5}$Zr$_{0.5}$ | 28 | 6.2 | 69 | NA | 572 | 600 | 653 | 342 | 365 | 407 | 392 |
| Mg—SiO$_2$ | 440 | 0.95 | 0.5 | 0 | 590 | 690 | >700 | 275 | 390 | 570 | 200 |
| Fe—ZrSiO$_2$ | 378 | 1.3 | 3.3 | 5.6 | 670 | >700 | >700 | NA | 400 | NA | 250 |
| CuO | 11 | 0.1 | 14 | NA | 597 | 650 | >700 | 368 | 411 | 509 | 425 |
| Fe-ZSM$_{5-50}$ | ~400 | 6 | 7.9 | 13.6 | 550 | 638 | >700 | 335 | 418 | 660 | 200 |
| Fe-ZSM$_{5-30}$ | ~400 | 6.6 | 15.5 | 4.4 | 615 | >700 | >700 | 380 | 430 | 480 | 200 |
| 10% Zr—SiO$_2$ | 400 | 0.32 | 1 | 9 | 535 | 635 | >700 | 290 | 470 | 510 | 390 |
| SiO$_2$ | 387 | 0 | 2.5 | NA | 585 | 670 | >700 | 315 | 490 | 670 | NA |
| Al:Ti 1:8 800° C. | 47 | 2.4 | 2.2 | 2 | 594 | 683 | 767 | 453 | 500 | 569 | 430 |
| Al:Ti 3:1 800° C. | 129 | 4.6 | 2.3 | 0 | 670 | 782 | >800 | 474 | 515 | 726 | 510 |
| Al:Ti 1:3 800° C. | 69 | 3.6 | 2.2 | 2 | 692 | 763 | ~800 | 486 | 517 | 544 | 500 |
| Cu, Mg-ZSM$_5$ | 360 | 7 | 16 | 3.4 | 650 | >700 | >700 | 395 | 535 | 670 | 260 |
| Cu$_{0.5}$Zn$_{0.5}$ | 12 | 0.2 | 70 | NA | 555 | 600 | 690 | 420 | 538 | 585 | 404 |
| Ag$_{0.15}$Ce$_{0.85}$ | 36 | 2.7 | 66 | 0 | 680 | >700 | >>700 | 378 | 540 | 614 | 390 |
| Cu$_{0.15}$Ce$_{0.85}$ | 71 | 1.4 | 105 | 0.5 | 670 | 695 | >700 | 480 | 540 | 570 | 440 |
| Al:Ti 1:1 800° C. | 92 | 5.0 | 1.7 | 0 | 702 | 791 | >800 | 510 | 542 | 642 | 510 |
| CeZr1:1 | 129 | 12 | 36 | 1.5 | 620 | 675 | >700 | 500 | 550 | 570 | 330 |
| ZrO$_2$ | 63 | 6.3 | 8.8 | 1.6 | 635 | >700 | NA | 520 | 555 | 600 | 440 |
| TiO$_2$ 600° C. | 26 | 2.3 | 3 | 1 | 615 | NA | NA | 500 | 556 | 574 | NA |
| Ce—SiO$_2$ | 408 | 0.4 | 4 | 1.5 | 615 | 674 | >700 | 470 | 574 | 612 | NA |
| Al$_2$O$_3$ 800° C. | 144 | 12.7 | 9.5 | 2.1 | 700 | >800 | >800 | 517 | 582 | 715 | 660 |
| CeO$_2$ | 106 | 3.1 | 30 | 1.2 | 670 | 695 | >700 | 580 | 590 | 615 | 440 |
| Y$_2$O$_3$ | 112 | 3.1 | 48 | NA | >700 | NA | NA | 575 | 605 | 645 | 420 |
| Ag$_{0.3}$La$_{0.7}$MnO$_x$ | 58 | 2.6 | 18 | NA | 690 | >700 | NA | 413 | 615 | 651 | 370 |
| Co$_{0.15}$Ce$_{0.85}$ | 96 | 0.4 | 11 | NA | >700 | NA | NA | 580 | 619 | 640 | 385 |
| ZrPr 1:1 | 90 | 24.4 | 31 | 1.35 | >700 | >>700 | >>>700 | 595 | 660 | NA | 200 |
| Pr$_6$O$_{11}$ | 39 | 15.2 | 60 | 0 | 583 | >700 | >>700 | 583 | 675 | >700 | 500 |
| CePr 1:1 | 93 | 3.6 | 39 | 1.24 | >700 | >>700 | >>>700 | 643 | 677 | 688 | 500 |
| Mn$_{0.15}$Y$_{0.85}$ | 134 | 4.3 | 202 | NA | >700 | NA | NA | 640 | 692 | 772 | 413 |

NA—non-available e. Copper-Based Systems (Invention)

Figure 3:
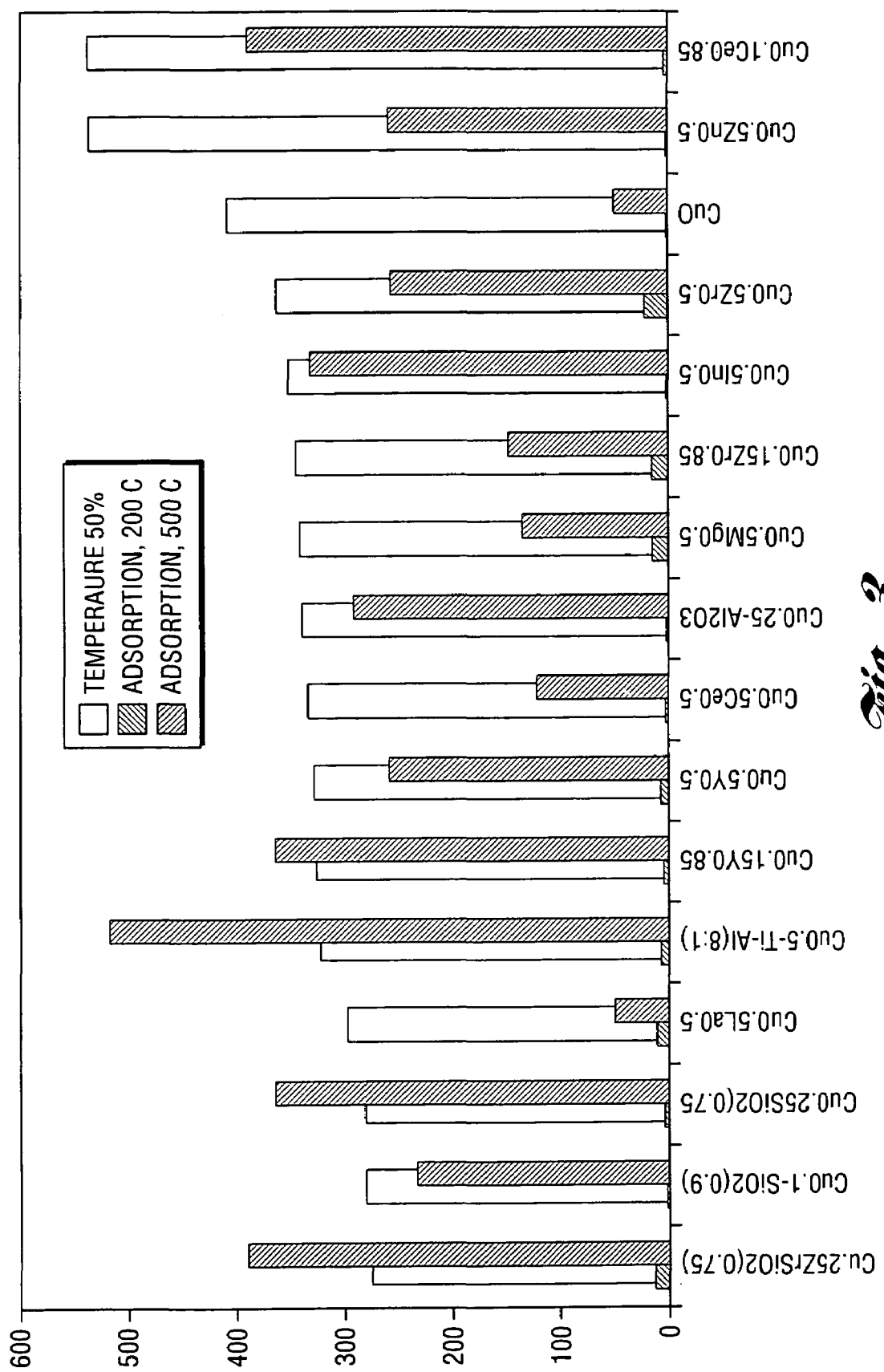
FIG. 3 is a bar chart summarizing the properties of the copper-based systems of the present invention.
Figure 4:
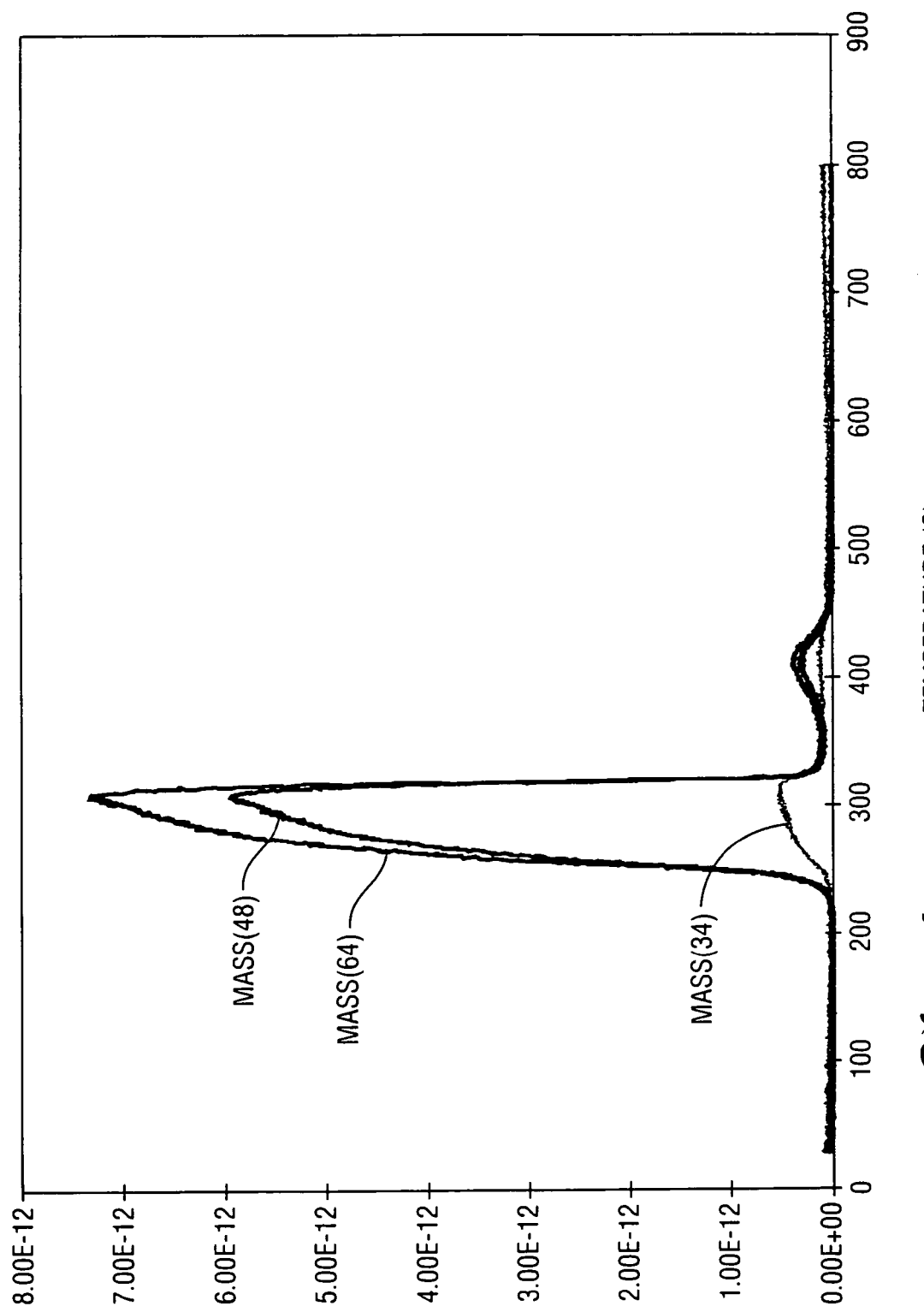
FIG. 4 provides plots of mass spectral analysis of the reductive regeneration products using the TPR-MS runs for $CuO_{0.25}SiO_2$ sulfated at 500° C. (1:1)
Figure 5:
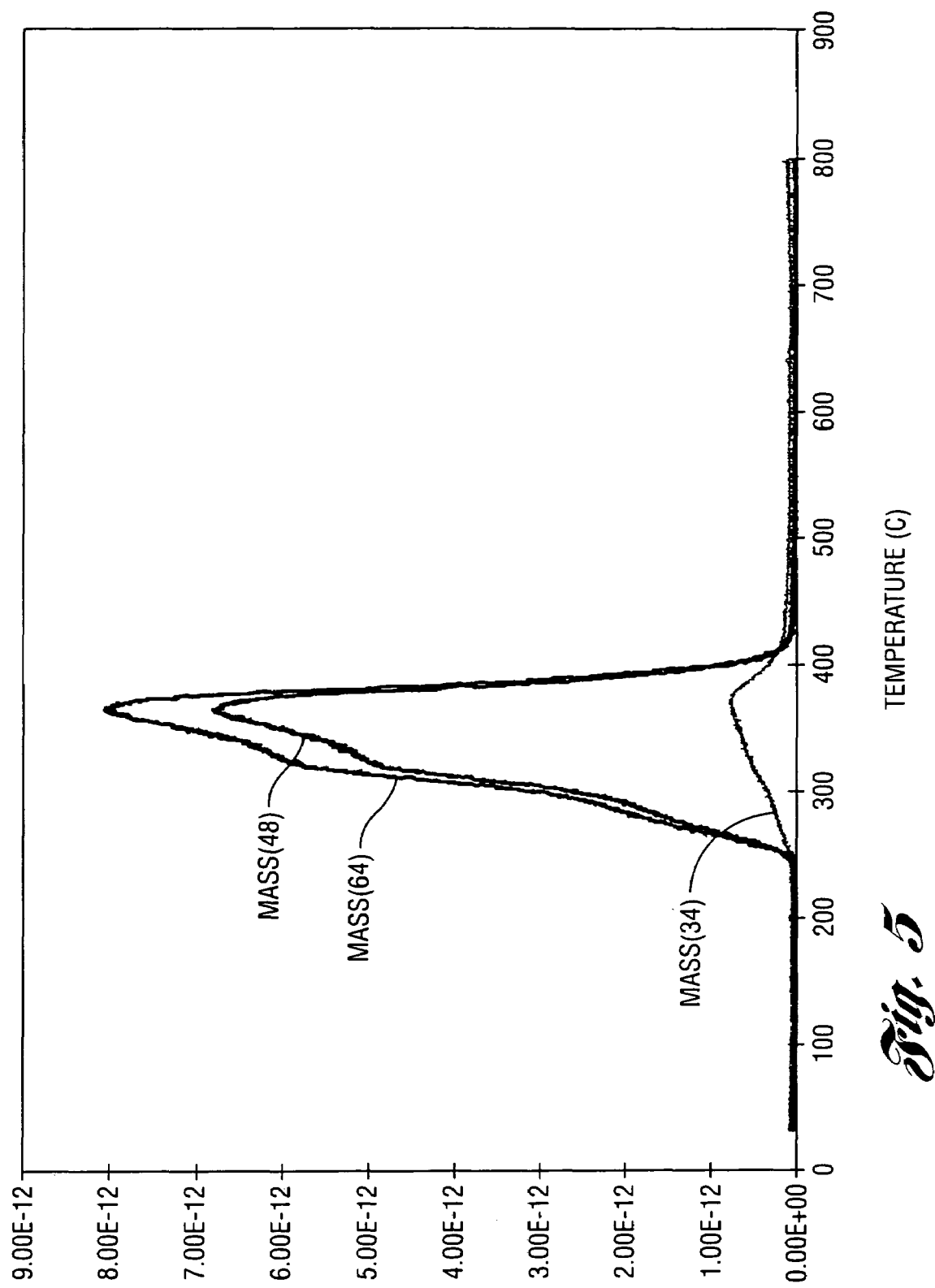
FIG. 5 provides plots of mass spectral analysis of the reductive regeneration products using the TPR-MS runs for Cu—Ti—Al (8:1) sulfated at 500° C. (1:1)
Figure 6:
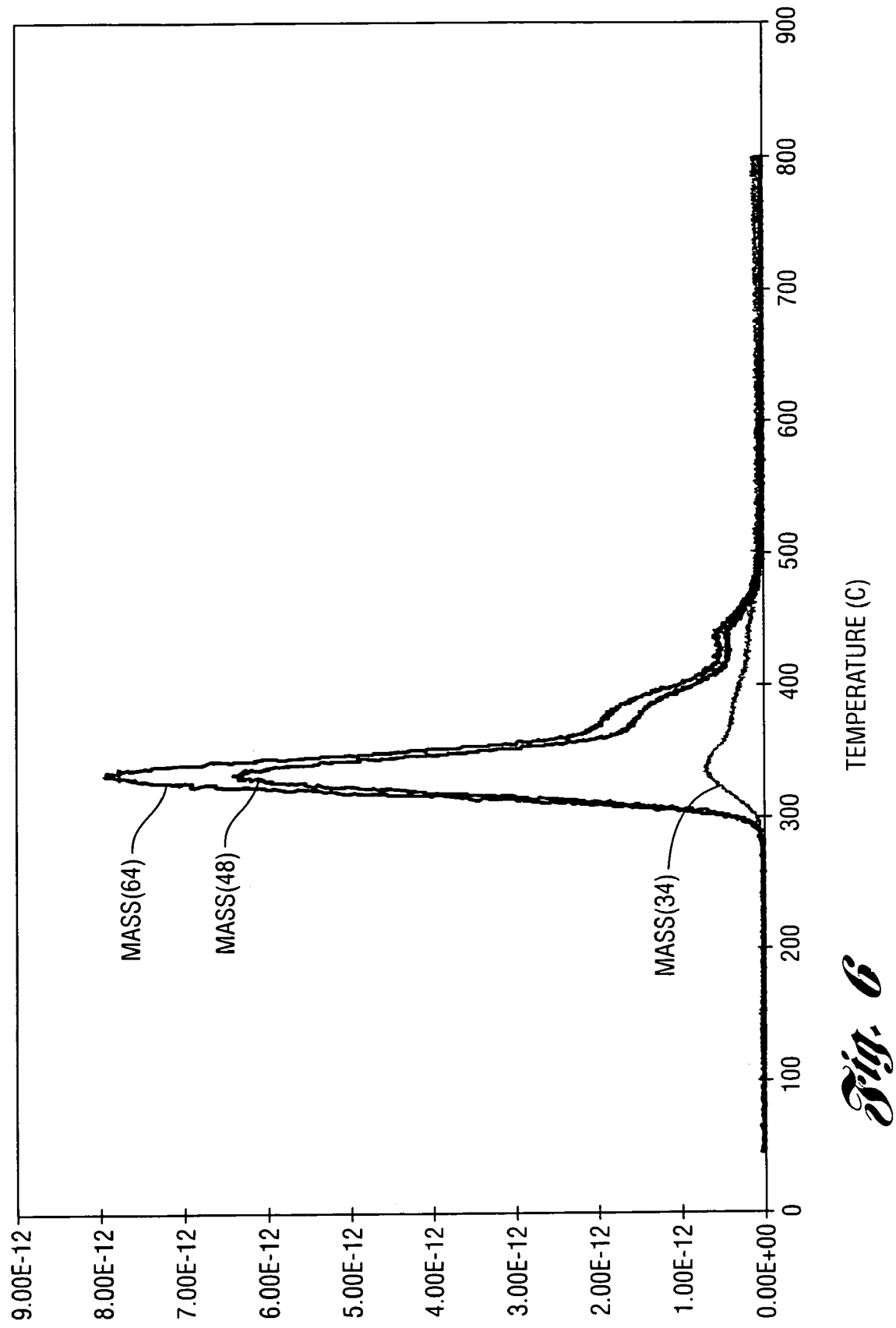
FIG. 6 provides plots of mass spectral analysis of the reductive regeneration products using the TPR-MS runs for $Cu_{0.25}$-gamma-$Al_2O_3$(0.75)sulfated at 500° C. (1:1).

The properties of copper-based systems are summarized in FIG. 3 (see also Table 3). The temperature of 50% sulfates reduction release under TPR conditions was minimal for Cu—ZrSiO$_2$ and Cu—SiO$_2$. Low temperature release was also found for Cu-zirconia, Cu-alumina, Cu-titania-alumina, Cu-ZSM5, Cu—In$_2$O$_3$ and for copper systems with yttria, lanthana and ceria with high copper concentration. However, the latter systems had at least two desorption peaks. The low temperature peak is obviously connected with CuO or Cu-enriched phase released at low temperature. The high temperature peak appears connected with yttria, lanthana or ceria, as indicated by comparison with those pure oxides. Therefore, these systems are not suitable for SO$_x$ trap applications because it is not possible to completely regenerate these materials at temperatures below 500° C. Cu-Zn and Cu—Ce mixed oxides have too high a temperature of desulfation under reducing conditions. The data shows that Cu on SiO$_2$ and Zr—SiO$_2$ has the lowest temperature for complete reductive regeneration. For the Cu on SiO$_2$ and Zr—SiO$_2$ system, nearly complete regeneration occurred at temperatures below 330° C. (see FIG. 4). The addition of Zr provides an increase in low-temperature sulfation and a slight increase in the adsorption capacity. SO$_2$ was the major product of sulfur reduction. For Cu-titania samples, a single peak of SO$_2$ release is observed. However, a higher temperature of about 400° C. is need for complete regeneration (see FIG. 5). The copper-alumina sample revealed 3 peaks of SO$_2$ desorption with practically complete removal of SO$_2$ occurring at about 450° C. (see FIG. 6). The entire amount of accumulated sulfates in the copper-zirconia system was regenerate at about 435° C. Finally, the copper-india sample exhibited two peaks with complete desorption of SO$_2$ at 450° C.

It should be appreciated that the copper-based systems in general exhibited lower temperature release of SO$_2$ than pure CuO under reducing conditions or than the support oxides alone (see Table 3). Accordingly, the combination of copper with those oxides leads to less stable sulfates and are beneficial for $SO^x$ trap properties. Moreover, a significant increase in adsorption capacity was found for the copper-based systems set forth above when compared to pure CuO. This improved storage capacity is probably due to the higher surface area of such mixed oxide combinations. The copper-based systems were observed to release $SO_2$ as a dominant product under reducing conditions in contrast to Pt-containing systems. Additional important advantages of these systems include low cost (except for Cu—$In_2O_3$) and a convenient method of preparation (impregnating commercial supports with copper nitrate for Cu-silica and Cu-alumina). Although Cu-based systems have a lower $SO_x$ removal capacity at low temperatures (about 200° C.) in comparison with Pt-containing materials, this characteristic poses little problem because these systems will likely be installed downstream of Pt-containing catalyst in many exhaust systems.

Accordingly, Cu-containing adsorbents, especially $Cu/SiO_2$, $Cu/ZrSiO_2$, and also $Cu/Al_2O_3$, $Cu/TiO_2$—$Al_2O_3$, $Cu/ZrO_2$, $Cu/In_2O_3$ are the most promising for applications as reversible $SO_x$ trap material. A particularly important feature of this variation of the present invention is a high copper loading. As can be seen in Table 3, the 3% mol.% Cu loading did not reveal high performance for Cu—$SiO_2$ and Cu-$ZrSiO_2$ systems. Better properties were found using 10 mol % and in particular using 25 mol % Cu loading, which is optimal for good adsorption-desorption properties. High Cu loading, in the range 10-60 mol % is particularly useful for automotive applications and differs from stationary applications, for which 2-5 mol° % Cu are typical, as mentioned earlier.

e. Irreversible $SO_x$ Traps

The term "irreversible trap" means that a trap cannot be regenerated at a typical temperature range of $NO_x$ trap operation (about 300-450° C.). The desulfation (regeneration) of such traps requires a separate mode of operation, e.g., it will be necessary to raise temperature under rich conditions. Although such traps are less attractive than reversible traps, these traps do have certain advantages when applied to current $NO_x$ trap technology. For example, these traps can prevent sulfur poisoning of $NO_x$ trap between desulfation events. As a result, the $NO_x$ trap performance will not be deteriorated, while desulfation can be done at the same mode as current desulfation strategy, by rising temperature to 600-650° C. under rich conditions for 10-20 minutes. Such traps are also valuable for $SO_x$ removal from stationary engines, manufacturing plants, and power plants, since the traps may be desulfated even at lean conditions.

Accordingly, the candidate materials for irreversible trap must have a high $SO_x$ storage capacity at 200-500° C. From the materials tested (see Table 3), $Pr_6O_{11}$ and mixed PrZr oxides show $SO_x$ storage properties which are comparable at low temperature of 200° C. with Pt-containing materials (see Table 2). Taking into account the disadvantages of Pt catalysts (i.e., high cost, irreversible poisoning by components of exhaust gases, $H_2S$ release under reducing conditions, etc., see FIG. 2), the praseodymia-based systems have a potential for stationary and plant applications. Mn—Y mixed oxide exhibits the highest adsorption capacity, but is less active in desulfation at low temperature and requires higher temperature of desulfation (see Table 3).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A platinum group metal free catalyst composition for entrapping $SO_x$, the catalyst composition comprising an oxide selected from the group consisting of zirconia-praseodymia, mixed manganese-yttria and mixtures thereof.

2. The catalyst composition of claim 1 further comprising praseodymia.

3. The catalyst composition of claim 1 comprising zirconia-praseodymia.

4. The catalyst composition of claim 1 comprising mixed manganese-yttria.

5. A method of adsorbing $SO_x$ as metal sulfate in a temperature range of 200° C. to 500° C. under lean fuel conditions, the method comprising contacting an exhaust with the catalyst composition of claim 1.

6. A method of desorbing metal sulfates at a temperature range of 250° C. to 450° C. under rich fuel conditions, the method comprising contacting an exhaust with the catalyst composition of claim 1.

7. A vehicle exhaust system comprising:
a nitrogen oxide trap; and
a $SO_x$ adsorbing component located upstream of the nitrogen trap in the vehicle exhaust system, the $SO_x$ adsorbing material comprising a catalyst selected from the group consisting of:
a) a platinum group metal-free (PGM-free) regenerable catalyst composition for entrapping $SO_x$ comprising a component having formula I;

$$Cu/(A\ oxide) \qquad\qquad I$$

wherein A oxide is selected from the group consisting of $SiO_2$, Zr—$SiO_2$, $Al_2O_3$, $TiO_2$—$Al_2O_3$, $ZrO_2$, $In_2O_3$, and mixtures thereof, wherein the platinum group metal-free regenerable catalyst has a Cu loading from about 10 mol % to about 60 mol %; or b) a platinum group metal free regenerable catalyst composition for entrapping $SO_x$, comprising an oxide selected from the group consisting of praseodymia, zirconia-praseodymia and mixed manganese-yttria and mixtures thereof.

8. The vehicle exhaust system of claim 7 wherein the $SO_x$ adsorbing material comprises a platinum group metal-free (PGM-free) regenerable catalyst composition for entrapping $SO_x$ comprising a component having formula I;

$$Cu/(A\ oxide) \qquad\qquad I$$

wherein A oxide is selected from the group consisting of $SiO_2$, Zr—$SiO_2$, $Al_2O_3$, $TiO_2$—$Al_2O_3$, $ZrO_2$, $In_2O_3$, and mixtures thereof.

9. The vehicle exhaust system of claim 8 wherein the A oxide is selected from the group consisting of $SiO_2$, Zr—$SiO_2$, $TiO_2$—$Al_2O_3$, $ZrO_2$, $In_2O_3$, and mixtures thereof.

10. The vehicle exhaust system of claim 8 wherein the A oxide is selected from the group consisting of $SiO_2$, Zr—$SiO_2$, and mixtures thereof.

11. The vehicle exhaust system of claim 7 wherein the $SO_x$ adsorbing material comprises an oxide selected from the group consisting of praseodymia, zirconia-praseodymia and mixed manganese-yttria, and mixtures thereof.

12. The vehicle exhaust system of claim 7 wherein the $SO_x$ adsorbing component is a diesel oxidation catalyst.

13. The vehicle exhaust system of claim 7 wherein the $SO_x$ adsorbing component is a catalyzed soot filter.

* * * * *